April 18, 1961  K. F. GREENE ET AL  2,979,770
MOLDING PRESS AND METHOD OF MOLDING
Filed May 6, 1952  2 Sheets-Sheet 1
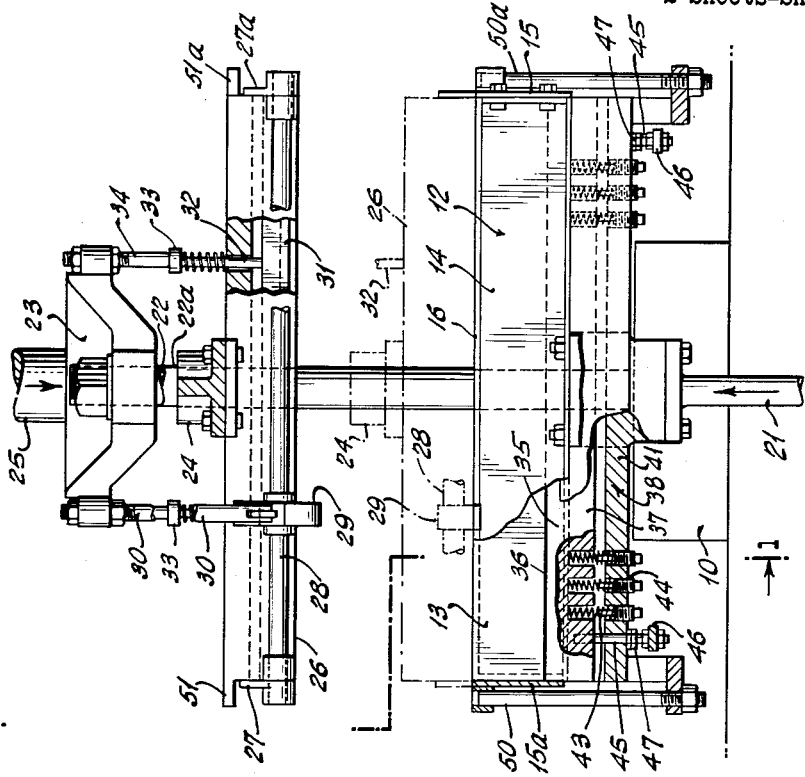
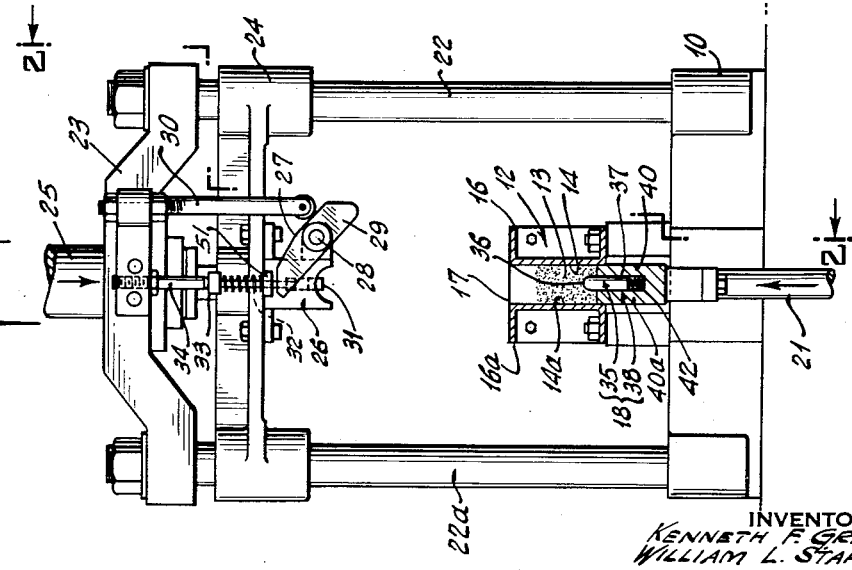
INVENTORS:
KENNETH F. GREENE
WILLIAM L. STAFFORD
BY Virgil C. Kline
ATTORNEY April 18, 1961 K. F. GREENE ET AL 2,979,770
MOLDING PRESS AND METHOD OF MOLDING
Filed May 6, 1952 2 Sheets-Sheet 2

INVENTORS:
KENNETH F. GREENE.
WILLIAM L. STAFFORD.
BY Virgil C. Kline
ATTORNEY.

United States Patent Office 2,979,770
Patented Apr. 18, 1961

2,979,770

MOLDING PRESS AND METHOD OF MOLDING

Kenneth F. Greene, Somerville, and William L. Stafford, Martinsville, N.J., assignors to Johns-Manville Corporation, New York, N.Y., a corporation of New York Filed May 6, 1952, Ser. No. 286,352

11 Claims. (Cl. 18—16.7)

This invention relates to a method of, and apparatus for molding, and more particularly to a method of, and apparatus for, molding semi-cylindrical pipe insulation sections of precise and true dimensions.

It is an object of this invention to provide a method of molding pipe insulation sections to semi-cylindrical form and dimensions from a moldable composition, particularly one containing particulate ingredients.

It is a further object of this invention to provide a molding press with specific die structure and action in which such shaped and dimensioned pipe insulation sections may be molded.

It is a more specific object of this invention to provide a method of, and press for, molding precisely shaped semi-cylindrical pipe insulation sections from a mixture of moldable ingredients to obtain a strong and durable self-sustaining body capable of being easily handled in subsequent procedures of manufacture and use.

It is an additional object of this invention to provide a method of, and apparatus for, molding semi-cylindrical pipe insulation sections having denser and stronger leg portions than molded sections heretofore fabricated.

It is also a specific object of this invention to provide an apparatus for molding semi-cylindrical pipe insulation sections without objectionable voids, chipped edges and the like, and with the precise shape and dimensions required for the desired insulating service.

With the above and other objects and features in view, the invention consists in the improved method of, and apparatus for, molding semi-cylindrical pipe insulation sections which are hereinafter described and more particulary defined by the accompanying claims.

In the following description, reference will be made to the accompanying drawings in which:

Fig. 1 is an end elevation, with some parts broken away and in section, of the molding press of this invention;

Fig. 2 is a side elevation, with some parts broken away and in section, of the press of Fig. 1;

Figure 3:
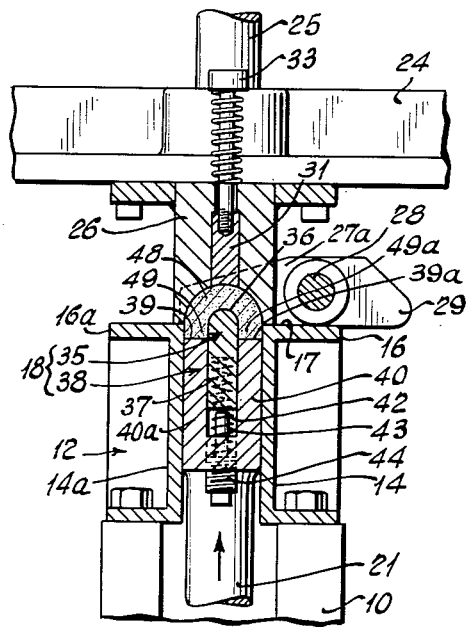
Fig. 3 is a detailed sectional elevation of the mold assembly of the press of Fig. 1 in an initial molding stage.

Referring to the drawings, the preferred molding apparatus according to this invention comprises a press frame bed 10 on which is mounted a mold cavity frame 12 which forms a rectangular open mold cavity 13 having a generally rectangular vertical cross-section. The mold cavity 13 is bounded by side walls 14 and 14a and end walls 15 and 15a of the mold cavity frame 12. The mold cavity frame 12 is provided with projections such as flanges 16 and 16a at its upper extremity in order to provide a flattened table-like surface 17 in the plane forming the upper extremity of the mold cavity 13.

A lower platen 18 is slidably mounted in mold cavity 13 and, as illustrated, comprises a convex semi-cylindrical die member 35 and a flattened die member 38 positioned on both sides of said convex die member 35, the upper surfaces of which form a bottom closure for mold cavity 13. Suitable means such as a hydraulic cylinder (not shown) are provided to actuate ram 21 and in turn actuate platen 18 for suitable movement through mold cavity 13, as will be more particularly defined hereinafter.

Vertically upstanding from the press frame bed 10 are support posts such as strain rods 22 and 22a which are secured at their upper portions to the fixed press yoke 23. Ram guide 24 is fixed to its actuating ram 25 and is slidably mounted on strain rods 22 and 22a, whereby the strain rods form guiding tracks for ram guide 24. A concave semi-cylindrical die member 26 is fixed to, and carried by, ram guide 24. The path of travel of the ram 25 is sufficient to position the lower surface of the semi-cylindrical concave die member 26 on the flattened table-like surface 17 in the plane forming the upper extremity of mold cavity 13, during the molding procedure, as hereinafter disclosed.

Closure gates 27 and 27a are fixed to, and positioned at, the longitudinal ends of the semi-cylindrical concave die member 26. These closure gates are fixed to, and connected by, rotatable shaft 28, to which is fixed gate cam 29. Closure gates 27 and 27a, in normal position, are urged closed to form end walls for die member 26 by any suitable means such as spring loading, etc. When ram guide 24 is in its upper position as shown in Fig. 1, closure gates 27 and 27a are raised from their normal die end closing position by means of rotation of the shaft 28. The rotation of shaft 28 is caused by the action of cam rod 30 which is fixed to the fixed yoke 23 and which operates against gate cam 29 which is fixed to shaft 28. The function and operation of closure gates 27 and 27a will be more particularly defined hereinafter.

Slidably mounted in, and extending the longitudinal length of die member 26 is ejector bar 31, the lower surface of which forms a portion of the concave configuration of the interior of die member 26 when ejector bar 31 is in normal unactuated position. Ejector bar 31 is fixed to an actuating pin 32 which has fixed thereto at its upper end a pressure plate 33. Ejector bar 31 is, in normal position, urged upwardly by any suitable means such as by spring loading actuating pin 32. When ram guide 24 is in its upper position as illustrated in Fig. 1, ejector bar 31 is urged downwardly from its position in die member 26 by means of the action of pusher rod 34 which is fixed to the fixed yoke 23, or by other suitable equivalent means. The lower surface of pusher rod 34 acts against pressure plate 33 which transmits the force through ejector pin 32 to downwardly displace ejector bar 31 from its normal position with its lower surface forming a portion of the concave interior surface of die member 26.

Figure 4:
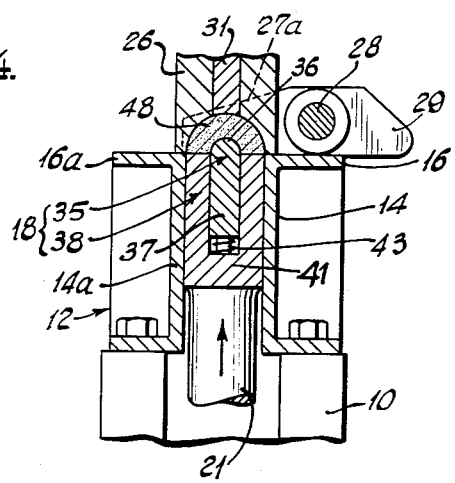
Fig. 4 is a detailed sectional elevation of the mold assembly of the press of Fig. 1 in the final stage of molding; and, Fig. 5 is a perspective view of a pipe insulation section formed in accordance with the method, and by the apparatus, of this invention.
Figure 5:
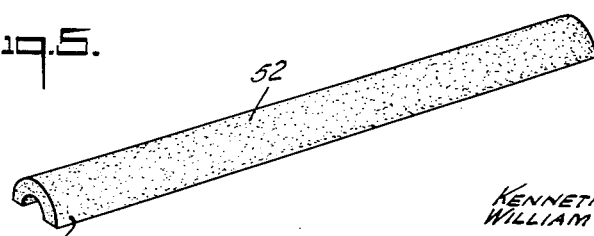

Referring now in more detail to the actual mold structure comprising upper die member 26 and platen 18, reference is made to Figs. 3 and 4. As clearly disclosed in these figures, platen 18 comprises two relatively movable die members. Extending longitudinally in the center of the platen is an essentially semi-cylindrical convex die member 35. This semi-cylindrical convex die member 35 is shaped with a semi-circular cross-sectioned upper portion 36 and has a generally rectangular portion 37 forming the lower extension thereof. Die member 35 is slidably mounted in die member 38 which has flattened upper surfaces 39 and 39a which are positioned on both sides of convex semi-cylindrical die member 35. Die member 38, forming the lower portion of platen 18, is fixed to lower ram 21. As shown in Figs. 2 and 3, semi-cylindrical convex die member 35 is slidably mounted between the flat-surfaced side portions 40 and 40a of die member 38 and is urged upwardly from the lower portion 41 (Fig. 4) of die member 38 by any suitable means such as compression spring 42. Compression spring 42 is held in proper position by means of pins 43 which are fixed to die member 38 by a threaded joint 44 or the like in the lower portion 41 of die member 38. Hold-down pin 45 is slidably mounted in lower portion 41 of die member 38 and is fixed to die member 35. The lower portion of hold-down pin 45 has fixed thereto a horizontal stalling flange 46, and a collar 47 or the like is fixed to pin 45 at a position intermediate the lower surface of die member 38 and horizontal stalling flange 46. Since pin 45 is fixed to die member 35, collar 47 prevents the springs 42 from urging die member 35 out of its position within die member 38. Horizontal flange 46 cooperates with mold cavity frame 12 to serve as a stall mechanism for die member 35 as hereinafter disclosed.

In operation of the preferred apparatus a charge of moldable ingredients is fed to mold cavity 13 by any suitable means. Ram 25 is actuated and transports ram guide 24, to which is fixed die member 26, downwardly until the lower surface of die member 26 is positioned on the flattened table-like surface 17 formed by flanges 16 of mold cavity frame 12, as illustrated in Figs. 3 and 4. As is clearly shown in these figures, die member 26 is formed with a concave semi-cylindrical cavity, the diameter of which is the same width as mold cavity 13. Upon descent of ram guide 24, the actuating force of cam rod 30 on gate cam 29 is released and shaft 28 rotates, due to spring loading or the like, to position closure gates 27 and 27a over the ends of die member 26. Similarly, upon descent of ram guide 24, the force applied by pusher rod 34 is released, and pressure plate 33, actuating pin 32, and ejector bar 31 are urged upwardly by any suitable means, such as spring loading, to move ejector bar 31 to its recessed position in die member 26 where the lower surface of the ejector bar forms a portion of the concave interior surface of die member 26.

When die member 26 is positioned on surface 17, lower ram 21 is actuated upwardly by any suitably means, thereby upwardly displacing die members 35 and 38. Die members 35 and 38 transport the charge of moldable materials in mold cavity 13 upwardly towards and into die member 26. As illustrated in Fig. 3, die member 35 is urged upward from die member 38 by suitable means such as compression spring 42. The initial molding of the ingredients present in die cavity 13 by the die members 35 and 38 so positioned forms a semi-cylindrical pipe insulation section 48 having extended leg portions 49, 49a. As illustrated, the semi-circular sectional portion 36 of die member 35 is, at this stage, entirely positioned above the plane of the lower surface of die member 26 and the flattened surface 17. When die member 35 reaches this point, it stalls out due to contact between the upper surface of the horizontal stalling flange 46 and the bottom surface of mold cavity frame 12. Further actuation of ram 21 continues the rise of die member 38 which compresses the extending leg portions of 49, 49a of the molded body and transports the material forming these leg portions upwardly into the semi-cylindrical cavity of the die member 26. The travel of die member 38 is stalled by the action of stalling rods 50 and 50a, fixed to the framing structure of die members 35 and 38, against flanges 51 and 51a of the framing structure of die member 26 which is carried by ram guide 24.

As may be seen from a consideration of the operation of the press structure as heretofore outlined, when molding is completed, the desired molded semi-cylindrical pipe insulation section is entirely formed within the semi-cylindrical cavity of die member 26. The interior surface of the cavity in die member 26 has a true semi-circular section and hence forms a true semi-cylindrically shaped body without flattened areas on the sides of the leg portions as have been obtained with molding structures heretofore utilized to form similar shapes. The convex semi-cylindrical surface of die member 35 forms the internal diameter of the insulation sections, and, as may be clearly seen in Fig. 4, this die surface results in a true semi-circular construction in the portion of the pipe insulation section which is positioned adjacent the pipe to be insulated.

While it is preferable to utilize the hereinbefore disclosed structure for die member 26, it is apparent that the hereindisclosed molding press may be modified to utilize an upper essentially semi-cylindrical die member 26 having a configuration allowing its entry into the mold cavity and its positioning adjacent the upper extremity of the mold cavity where the uppermost point of the concave die cavity is just within the mold cavity. With such a structure for die member 26, closure gates 27 and 27a are eliminated, and the end walls of mold cavity 13 serve as confining elements for the ends of die 26. Such a configuration for die member 26 will allow the molding of essentially semi-cylindrical pipe insulation sections, but these sections will have flattened shoulders on the leg portions since the die member must be feathered at its lower extremity. This feathered edge obviously results in such a flattened shoulder since a portion of the side walls of the mold cavity will be serving to retain the materials between the upper and lower die members. Since such flattened shoulders are considered objectionable, the hereinbefore disclosed structure of die member 26 is preferably utilized to enable the molding of true semi-cylindrical pipe insulation sections.

The double pressing action obtained by the use of the convex semi-cylindrical die member 35 of lesser cylinder radius than the concave semi-cylindrical die member 26, and the flattened die member 38 movably positioned on both sides of the convex die member 35, results in a molded pipe insulation section 52 having a true semi-cylindrical shape and having strength and toughness in the leg portions 53 of the finally fabricated molded body. This strength and toughness in the leg portions 53 are most desirable to impart to the body strength in this area where the body is the weakest, and where the molded body is often damaged during shipping, application and the like.

When the molding of the body is completed, rams 21 and 25 are actuated outwardly, and the molded body 52 is transported upward within die member 26. As ram guide 24 rises, cam rod 30 contacts cam 29 and rotates shaft 28 to lift closure gates 27 and 27a from their position closing the ends of die member 26, and hence away from the ends of the molded body 52 carried in die member 26. Similarly, pusher rod 34 contacts pressure plate 33 and actuates pin 32 and ejector bar 31 downwardly. Ejector bar 31 dislodges the molded body 52 from its position within the cavity of die member 26 and ejects it from the press. Suitable means may be provided to receive the molded body ejected from the press by the action of ejector bar 31.

The press and method of molding herein disclosed is particularly adapted for molding pipe insulation sections from a composition of moldable ingredients containing common bonding materials, including thermally activated binders. Conventional means may be added to the press structure to allow thermal curing of the binder in the press, if desired. When utilizing the herein-disclosed press and method of molding with moldable materials having the proper characteristics for the purpose, a semi-cylindrical pipe insulation section may be molded to precise shape and dimensions, and, as heretofore disclosed, the cooperation of elements of this molding press results in a strong, durable insulating body handleable in further procedures, and without voids and damaging chips and the like due to the action of press elements.

It will be understood that the details given herein are for the purpose of illustration, not restriction, and that variations within the spirit of the invention are intended to be included in the scope of the appended claims.

What we claim is:

1. A molding press comprising, first and second opposed dies, means for holding said first die positively in a predetermined molding position opposite said second die, said second die comprising first and second compression members, resilient means reacting between said compression members to bias said first compression member yieldingly away from said second compression member and toward said first die, first stop means limiting the relative movement of said first compression member away from said second compression member under the action of said resilient means, means for acting on said second compression member and urging both said compression members simultaneously toward said first die in a molding operation, second stop means for positively stopping the motion of said first compression member toward said first die at a predetermined molding position spaced therefrom, third stop means for thereafter positively stopping the motion of said second compression member toward said first die after said second compression member has continued its travel to a predetermined molding position against the force of said resilient means, so as to provide for a predetermined greater densification of the portion of the molded product compressed between said second compression member and said first die than between said first compression member and said first die.

2. A molding press as defined in claim 1, in which said first mentioned means mounts said first die for movement to an open press position, said first die comprising further an ejector bar having a surface forming in retracted position a part of the molding surface of said first die, said ejector bar being slidable forwardly in said first die to an ejection position, resilient means urging said ejector bar to its said retracted position, and stop means for automatically urging said ejector bar to its ejection position against the force of the last mentioned resilient means upon the travel of said first die to its said open press position.

3. A press for the formation of hollow-center, semi-cylindrical pipe insulation sections, which comprises, a mold cavity having side walls spaced from each other a predetermined distance, a first die having a semi-cylindrical concavity, means for locating said first die with said concavity spanning the distance between said side walls at one extremity of said cavity and closing that extremity of the cavity, said concavity having a diameter equal to said distance, a second die closing the opposite extremity of said cavity and slidably mounted therein comprising a central inner compression member having a semi-cylindrical convex portion aligned axially with said concavity and opposed to the central portion thereof, and an outer compression member having spaced legs slidably embracing said inner compression member and having terminal portions directed toward the opposed portions of said concavity, resilient means reacting between said compression members to bias said inner compression member yieldingly away from said outer compression member and toward said concavity, first stop means limiting the relative movement of said inner compression member away from said outer compression member under the action of said resilient means, means for acting on said outer compression member and uring both said compression members simultaneously toward said concavity in a molding operation, second stop means for positively stopping the motion of said inner compression member toward said concavity with its convex surface at a predetermined molding position spaced therefrom but within said concavity, third stop means for thereafter positively stopping the motion of said outer compression member toward said concavity after said outer compression member has continued its travel to a predetermined molding position.

4. A press as defined in claim 3 comprising further, means mounting said first die for movement from a retracted, open press position to its closed press position opposite said second die, said concavity of said first die having open ends when said first die is in its open press position, closure gates for said open ends, means mounting said closure gates for movement to close said open ends upon movement of said first die to its closed press position, and means for automatically actuating said closure gates to uncover said open ends upon the retraction of said die to its open press position.

5. In a molding press, a die having an elongated die concavity having open ends when said die is in a retracted, open press position, means mounting said die for movement from said open press position to a closed press position, closure gates for the open ends of said concavity, means mounting said closure gates for movement to close said open ends upon movement of said die to said closed press position, and means for automatically actuating said closure gates to uncover said open ends upon the retraction of said die to said open press position.

6. A molding press comprising a rectangular mold cavity, a first die member having a concave semi-cylindrical mold chamber, means for positioning said first die member adjacent said mold cavity and holding the outer edges of its concave semi-cylindrical mold chamber in abutting relationship with the outer edges of said mold cavity whereby the inner walls of the mold cavity and the concave semi-cylindrical mold chamber form a continuous chamber, a second die member opposing said first die member slidably mounted within the mold cavity, said second die member comprising first and second compression members, said first compression member being positioned within and aligned axially with the second compression member, resilient means reacting between said compression members to bias said first compression member yieldingly away from said second compression member and toward said first die member, first stop means limiting the relatively movement of said first compression member away from said second compression member under the action of said resilient means, means for acting on said second compression member and urging both said compression members simultaneously toward said first die member in a molding operation, second stop means for positively stopping the motion of said first compression member toward said first die member at a predetermined molding position spaced therefrom, third stop means for thereafter positively stopping the motion of said second compression member toward said first die member after said second compression member has reached a position adjacent the outer edges of the concave semi-cylindrical mold cavity of said first die member.

7. A molding press comprising a rectangular mold cavity, a first die member having a concave semi-cylindrical mold chamber, means for superimposing and holding the outer edges of said first die member in abutting relationship with the outer edges of said mold cavity whereby the concave semi-cylindrical mold chamber of said first die member spans the mold cavity and the inner walls of said mold cavity and said concave semi-cylindrical mold chamber form a continuous chamber, a second die member slidably mounted within the mold cavity, said second die member comprising first and second compression members, said first compression member being positioned within and aligned axially with the second compression member, resilient means reacting between said compression member to bias said first compression member yieldingly away from said second compression member and toward said first die member, first stop means limiting the relative movement of said first compression member away from said second compression member under the action of said resilient means, means acting on said second compression member and urging both said compression members simultaneously toward said first die member in a molding operation, second stop means for positively stopping the motion of said first compression member toward said first die member at a predetermined molding position spaced therefrom.

8. The method of molding a semi-cyclindrical pipe insulation section, which comprises charging a mold cavity with a moldable material, compressing the moldable material to form a concave, hollow-center, generally semi-cylindrical body of ultimate thickness and length and with extended longitudinal ends forming leg portions, then further densifying the leg portions while uniformly maintaining the ultimate thickness and length dimensions of said body by simultaneously applying pressure to both longitudinal ends forming the leg portions and further compressing said leg portions to form a true semi-cylindrical shape.

9. The method of molding a semi-cylindrical pipe insulation section, which comprises charging a mold cavity with a moldable material, forming a concave, hollow-center, generally semi-cylindrical body of ultimate thickness and length and with extended longitudinal ends forming leg portions by compressing the moldable material transversely and centrally along its longitudinal axis, then further densifying the leg portions while uniformly maintaining the ultimate thickness and length dimensions of said body by simultaneously applying pressure to both longitudinal ends forming the leg portions and further compressing said leg portions to form a true semi-cylindrical shape.

10. The method of molding a hollow semi-cylindrical pipe insulation section, which comprises charging a mold cavity with a charge of moldable material, transporting said charge along said cavity to place most of the charge in a concave semi-cylindrical die member and compress said charge to a hollow center, generally semi-cylindrical form of ultimate thickness and length, but having leg portions extending beyond the concave semi-cylindrical die member and into said cavity, and then compressing said leg portions further and just sufficiently to place the remainder of the material of the charge in the concave semi-cylindrical die member while uniformly maintaining the ultimate thickness and length dimensions of said charge, so as to form a true hollow semi-cylindrical shaped pipe insulation section within said concave die member.

11. The method of molding a hollow semi-cylindrical pipe insulation section, which comprises charging a mold cavity with a charge of moldable material, transporting said charge by means of a convex semi-cylindrical die member of smaller radius through said die cavity to place most of the charge in a concave semi-cylindrical die member, which closes off one extremity of the cavity, and thereby compressing said charge against said concave die member to a hollow center, generally semi-cylindrical form of ultimate thickness and length, but having leg portions extending beyond said concave die member and into said cavity, and then further compressing only said leg portions sufficiently that the remainder of the material of the charge is forced into said concave die member with the terminal portions of said leg portions lying substantially coplanar with a diametrical plane on which the semi-cylindrical die members are formed while uniformly maintaining the ultimate thickness and length dimensions of said charge, so as to further densify said leg portions to form a true hollow semi-cylindrical shaped pipe insulation section within said concave die member.

References Cited in the file of this patent

UNITED STATES PATENTS

| | | |
|---|---|---|
| 915,783 | Meeker | Mar. 23, 1909 |
| 1,402,293 | Heist | Jan. 3, 1922 |
| 1,624,904 | Claus | Apr. 12, 1927 |
| 1,950,284 | Baenziger | Mar. 6, 1934 |
| 2,090,784 | Davis | Aug. 24, 1937 |
| 2,135,803 | Dumert | Nov. 8, 1938 |
| 2,325,687 | Kux | Aug. 3, 1943 |
| 2,350,971 | Pecker et al. | June 6, 1944 |
| 2,488,581 | Cherry et al. | Nov. 22, 1949 |
| 2,556,951 | Weidner | June 12, 1951 |